(12) United States Patent
Schmidt

(10) Patent No.: US 6,943,820 B2
(45) Date of Patent: Sep. 13, 2005

(54) SYSTEMS AND METHODS TO REVERSIBLY CONVERT A FILM-BASED CAMERA INTO A DIGITAL CAMERA

(75) Inventor: Dominik J. Schmidt, Palo Alto, CA (US)

(73) Assignee: Gallitzin Allegheny LLC, Los Altos, CA (US)

(*) Notice: Subject to any disclaimer, the term of this patent is extended or adjusted under 35 U.S.C. 154(b) by 810 days.

(21) Appl. No.: 09/802,467

(22) Filed: Mar. 9, 2001

(65) Prior Publication Data

US 2004/0141088 A1 Jul. 22, 2004

(51) Int. Cl.⁷ .................................................. H04N 9/47
(52) U.S. Cl. ......................... 348/64; 348/372; 348/373; 348/374; 348/375; 396/429
(58) Field of Search .................. 348/220, 231, 348/233, 64, 376, 373, 374, 375, 372, 273, 272, 266, 280, 275; 396/429; 358/209, 909

(56) References Cited

U.S. PATENT DOCUMENTS

| | | | |
|---|---|---|---|
| 4,916,476 A | | 4/1990 | McGarvey |
| 5,282,040 A | * | 1/1994 | Sapir ........................ 348/220.1 |
| 5,452,000 A | * | 9/1995 | Sapir ........................ 348/220.1 |
| 5,561,458 A | | 10/1996 | Cronin et al. |
| 5,625,429 A | * | 4/1997 | Kazami et al. ............. 396/300 |
| 6,181,883 B1 | * | 1/2001 | Oswal ........................ 396/429 |
| 6,278,481 B1 | | 8/2001 | Schmidt |
| 6,351,282 B1 | * | 2/2002 | DeLeeuw et al. ...... 348/231.99 |
| 6,370,339 B1 | * | 4/2002 | Stern et al. ................. 396/429 |
| 6,393,224 B1 | * | 5/2002 | Stern et al. ................. 396/429 |

OTHER PUBLICATIONS

Sauvante, Michael. "Roll–to–Roll Manufacturing." Jan. 23, 2001. URL: http://web.archive.org/web/20010123204900/www.rolltronics.com/Roll2roll.htm.*

S. D. Theiss, P. G. Carey, P. M. Smith, P. Wickboldt and T. W. Sigmon, Y. J. Tung and T.–J. King, PolySilicon Thin Film Transistors Fabricated at 100°C on a Flexible Plastic Substrate, http://www.rolltronics.com/llnl_tfts.htm.

* cited by examiner

Primary Examiner—Wendy R. Garber
Assistant Examiner—Chriss S. Yoder, III
(74) Attorney, Agent, or Firm—Trop, Pruner & Hu, P.C.

(57) ABSTRACT

An apparatus captures a digital image from a film-based camera having a chamber to receive a film cartridge and a take-up spool to advance the film after each shot. The apparatus includes a cartridge shaped to fit in the camera film chamber, the cartridge including a processor, a storage unit coupled to the processor, and an input output unit coupled to the processor. The cartridge houses a flexible strip having one end coupled to the cartridge and the other end adapted to be wound on the camera take-up spool, the flexible strip containing one or more imaging arrays deposited thereon to capture the digital image, each of the imaging arrays communicating with the processor.

31 Claims, 4 Drawing Sheets

SYSTEMS AND METHODS TO REVERSIBLY CONVERT A FILM-BASED CAMERA INTO A DIGITAL CAMERA

BACKGROUND

The present invention relates to an apparatus to reversibly convert a film camera into a digital camera.

Conventionally, the art of photographic image recording typically is performed by sequentially projecting optical images of subjects onto a roll of film formed from a silver halide based emulsion. Latent images are captured when photons strike chemical grains in the silver halide emulsion. After completing exposure of all the frames on the roll of film, the latent images are developed by chemical processing and are viewed directly or printed on positive paper.

Film-based cameras such as 35-millimeter cameras have been in reliable use for decades. Recently, Advanced Photo System (APS) cameras have been deployed which introduce users to various benefits over prior photographic systems. For example, aside from allowing multiple imaging formats, APS cameras allow users to easily load film cartridges without having to handle or manage film strips. To achieve such benefits, APS cameras typically include film cartridge assemblies that automate the loading and support of film cartridges and the advancement of film strips during film exposure and movement operations While conventional photographic camera and film systems offer high-resolution photographs, the image storage and retrieval is inconvenient and time consuming. Further, it is difficult and costly to copy, modify or transmit photographic images. Additionally, to use such images in electronic computer or video systems, the photographic image must first be converted to an electronic image in the form of an electrical signal representative of the photographic image. To overcome these limitations, cameras using charge-coupled devices (CCDs) have been used for recording images electronically and a storage device such as a tape, disk or a memory circuit for storing electrical image signals. The image signals are transferred to a display device for viewing or a printer for printing.

U.S. Pat. No. 4,916,476, issued to McGarvey, discloses an electro-optical circuit for converting a conventional single lens reflex (SLR) camera into an electro-optical camera. The electro-optical circuit is attached to the film back of the camera so that it is operational as a still camera or as an electro-optical camera.

U.S. Pat. No. 5,561,458, issued to Cronin, et al., discloses an electronic imaging module that is removably insertable into a photographic camera for reversibly converting the camera into an electronic imaging camera. The electronic imaging module includes a sensing unit, a processing unit, and a coupling unit. The sensing unit detects an object image and converts the image to a corresponding electrical signal. The processing unit, which is configured for location within the camera's film cassette holder, includes a storage unit for storing the electrical signal and a transmission link for transmitting the electrical signal to external devices such as a control unit or a base unit. The coupling unit couples the sensing unit to the processor unit. The coupling unit is adjustable to ensure that the sensing unit is in alignment with the camera optical path and the film plane and the processing unit is secured within the film cassette holder.

Additionally, U.S. application Ser. No. 08/723,623 by the Applicant discloses a digital camera that operates inside and in conjunction with a non-digital camera that includes an imaging array that senses the image to be recorded and a light detector that detects the presence of light due to the opening of the shutter aperture of the camera. The light detector controls the imaging array so that an image is digitally captured when the photographer depresses the shutter button to take a picture. These images can then be sent to an external computer, printer or display for processing or viewing.

SUMMARY

In one aspect, an apparatus captures a digital image from a film-based camera having a chamber to receive a film cartridge and a take-up spool to advance the film after each shot. The apparatus includes a cartridge shaped to fit in the camera film chamber, the cartridge including a processor, a storage unit coupled to the processor, and an input output unit coupled to the processor. The cartridge houses a flexible strip having one end coupled to the cartridge and the other end adapted to be wound on the camera take-up spool, the flexible strip containing one or more imaging arrays deposited thereon to capture the digital image, each of the imaging arrays communicating with the processor.

Implementations of the above aspect may include one or more of the following. The strip can be made from plastic such as polyethylene terephthalate (PET). The strip can be made from a roll-to-roll process. A shutter opening sensor can be positioned on the strip. The storage unit can store parameter data associated with each digital image, including print format, lighting condition, subject distance, time of exposure, or date of exposure. The parameter data can be communicated automatically to photographic finishers who utilize the parameter data to improve print quality. A compression engine can be connected to the processor to compress image data or video data. The compression engine includes JPEG or MPEG compression engine. The input output unit can include a serial port, a parallel port, a Universal Serial Bus (USB) port, a PCMCIA port, an infrared port, or a wireless port such as a Bluetooth port. The camera has a rewinder motor to automatically advance or retract the strip. The adapter includes a tension generator driving a spool in the cartridge and controlled by the processor, the tension generator retarding spool rotation to simulate end of film to the camera.

In another aspect, a method supports taking a digital image from a film-based camera having a shutter, a chamber to receive a film cartridge and a take-up spool to advance the film after each shot. The method includes mounting a cartridge in the camera film chamber, the cartridge storing a flexible strip containing one or more imaging arrays deposited thereon; wounding one end of the flexible strip on the camera take-up spool; and upon detecting a shutter opening, capturing the digital image and storing the captured image.

Advantages of the system may include one or more of the following. The system allows non-digital cameras that operate when film is automatically wound by the camera to be converted into a digital camera. The system can be removably inserted into a conventional camera at its film cassette holder location and the strip can be wound onto the camera's take-up spool as is usually done. This feature gives the user the options of using conventional silver halide film with the camera or reversibly converting the camera into an electronic imaging camera. The system is intuitive and easy to use since most camera users are familiar with the operation of conventional cameras such as feeding and winding the strip onto the take-up spool. The system provides electronic imaging capability to conventional film-based cameras in an inexpensive manner. Further, this is done without requiring special attachments to the cameras such as interchangeable film backs and adapters.

Using the adapter of the present invention, images can therefore be transmitted quickly and efficiently to remote locations, can be displayed on computer or television equipment, can be transmitted via telephone lines as a fax, can be provided to the internet or worldwide web rapidly, and can allow digital manipulation of images. Facilities that allow rapid, high quality, high resolution printouts of digital images recorded on digital cameras can easily be used in accordance with the present invention to print out extremely high quality prints of photographs recorded using the present invention, using at least all of the digital enhancement techniques that may be used with the expensive digital camera technologies.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

Figure 1:
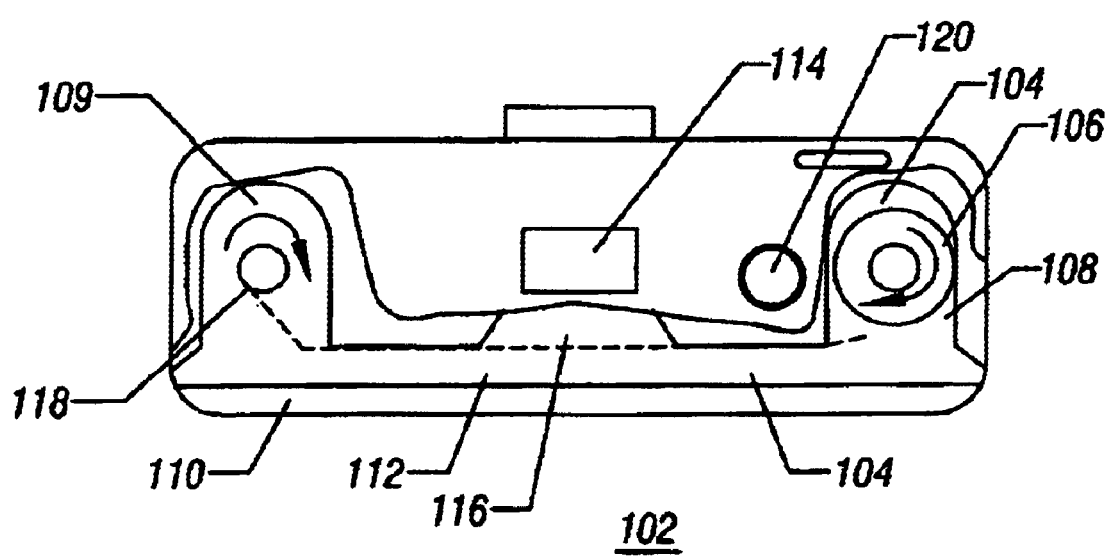
FIG. 1 shows a conventional film-based camera.

Referring now to FIG. 1, a prior art film-based camera 102 is shown. Although such cameras are very well known, a brief overview of typical camera functions will introduce a context in which embodiments of the present invention may be more easily understood. In one embodiment, a 35 millimeter camera 102 has a film chamber 104 for receiving an unexposed roll of film 106 into a substantially cylindrical film roll areas 108. The film chamber 104 includes a thin, substantially flat area 112, located behind the shutter aperture 114 and the cylindrical film roll area 108 which provides a larger region at one end of the film chamber 104 and a second cylindrical take up area 109. The film chamber 104 is encloseable by a film chamber door 110 that is opened to inset the unexposed roll of film 106. The flat area 112 may be part of the film chamber door 110 in which film is held while the shutter aperture 114 is open to expose a region 116 on the film to light passing through the aperture 114.

When the film chamber door is closed while film is properly in place, a film take-up reel 118 rotates to draw onto the take-up reel 118 a portion of the film. Thereafter, each time the shutter button 120 is pushed to be varied from image to image, for an entire photographic session or consistently applied to the images stored in the memory.

As regions of the film are individually and sequentially exposed, the film take-up reel 118 temporarily draws the exposed regions on the film onto the take-up reel 118. In some cameras the take-up reel 118 automatically advances to accept more of the exposed regions of film, while in other cameras the take-up reel 118 is mechanically advanced by the user. In the automatic version, a winder 140 allows the film to be automatically advanced for the next shot or rewind when strip usage is completed. The winder 140 of the camera is basically a spool drive consisting of a motor, a spool portion and a sprocket portion.

After each picture is taken with the camera, the film is wound manually by photographer or automatically by a motor in a winding direction to similarly rotate the film take-up spool inside the film cartridge. This winds an exposed frame of the filmstrip from a rear backframe opening in the main body part into the film cartridge and advances an unexposed frame of the filmstrip from the unexposed film roll to the rear backframe opening. The rewinding movement of the filmstrip the equivalent of slightly more than one frame width rotates the metering sprocket in engagement with the filmstrip to increment an exposure counter wheel to its next-numbered indicia and to pivot a metering lever to prevent further rotation of the film in the film winding direction.

Once substantially all the film has been advanced onto the take-up reel 118 and the roll 106 is nearly empty, the film take-up reel 118 releases the film, and the exposed film is automatically or mechanically wound back into the roll 106. Then, after the film is wound back into the roll 106, the film chamber door 108 may be opened and the roll of used film can be removed.

Figure 2:
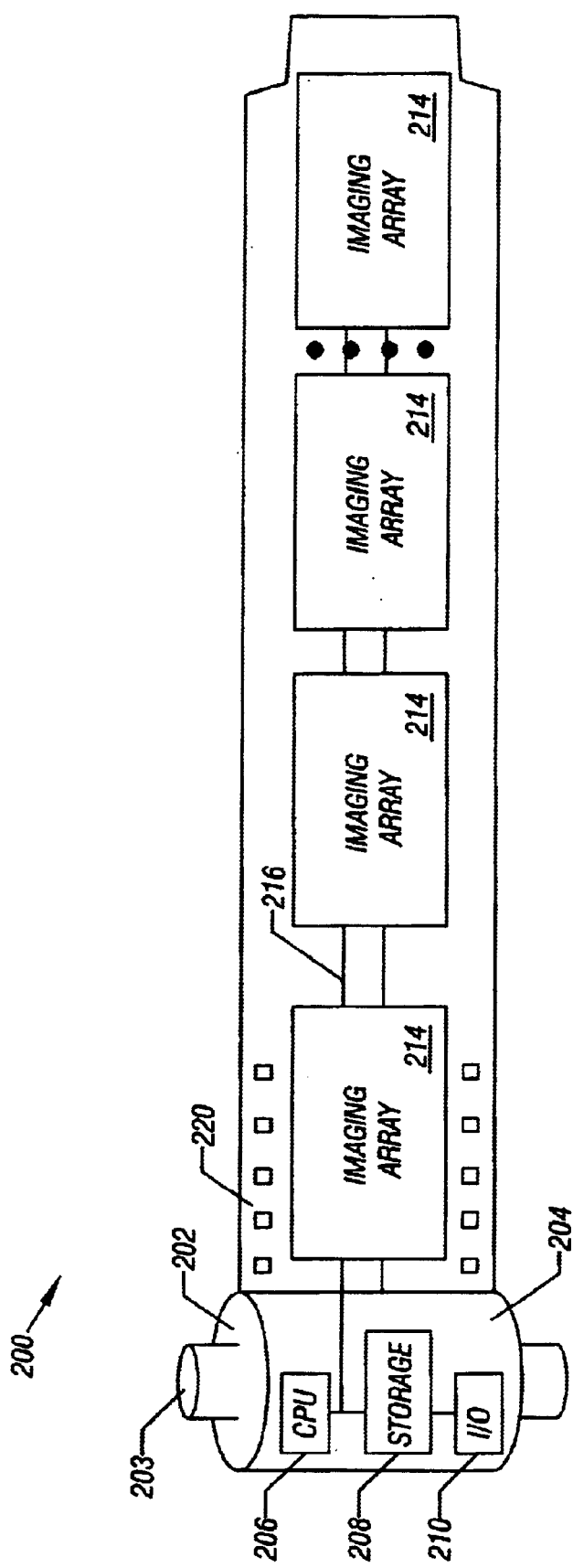
FIG. 2 illustrates an adapter with a flexible strip containing imaging arrays to convert the camera to take digital photographic images.

FIG. 2 illustrates an adapter 200 that adapts the camera 102 to take digital photographic images. The adapter includes a film cartridge 202 that is shaped to rest in the film chamber 104 of the photographic camera 102 of FIG. 1. In one version, the cartridge 202 is a 35-mm cartridge. In another version, the cartridge 202 is an APS compatible cartridge.

The cartridge 202 contains a core section 204 that houses a processor 206 coupled to a storage unit 208, which can be a nonvolatile memory such as electrically erasable programmable read only memory (EEPROM), flash memory or other forms of solid state memory. The processor 206 also communicates with an input/output unit 210, which can be a serial port, a parallel port, a Universal Serial Bus (USB) port, a PCMCIA port, an infrared port, or a wireless port such as a Bluetooth port. Preferably, the processor 206, the storage unit 208, and the input/output unit 210 are embedded on a single chip.

The input/output unit 210 supports reading the images stored in the memory and downloading the images for viewing, post processing, editing, printing or the like. In its simplest form, the input/output unit 210 is a standard interface, such as an RS-232 interface, and controller that downloads the entire memory when the interface is connected to an external device, such as a computer system or digital photo processing or editing system. In this embodiment, an external computer system would control the input output unit 210 to read the memory and download the image information. Alternately, some intelligence can be added to the input output unit 210, or digital circuitry can be used to control the download of the digital images. Furthermore, the adapter 200 can include the necessary circuitry to drive certain equipment, such as a monitor or printing device, to display or print the digital images. In those embodiments, a processor or circuitry located on the adapter would provide the logic to configure the data in a compatible format. The adapter would also include, if needed, additional circuitry to perform digital to analog conversion or signals of prespecified levels compatible with the output device the adapter is coupling to. Thus, the adapter 200 could be used, for example, to drive a monitor or a printer. The adapter could also enable the user to fax images through a telephone line using an RJ-11 connector. It is also contemplated that the adapter also includes circuitry to perform direct pixel to NTSC conversion, NTSC being a standard in the television industry. Furthermore, the adapter can be configured with the necessary logic and connectors to providing outputs compatible with a computer system and analog NTSC/PAL/SECAM output.

The processor 206 communicates with one or more imaging arrays 214 deposited on a flexible strip 220. The strip 220 is mechanically secured to the core section 204 and can wrap around the core in the same way that conventional film is wound inside a conventional film cartridge. In one embodiment, the cartridge 202 contains a battery to power the processor 206, the storage unit 208 and the input/output unit 210. In another embodiment, the cartridge 202 receives power from the camera's battery.

The one or more imaging arrays 214 are deposited on a flexible strip 220 with one end of the strip 220 secured to the cartridge 202. Affiliated with each imaging array 214 is a light detector to determine when the shutter has been activated. The strip 220 communicates with the processor 206 over a bus 216 that is also deposited on the flexible strip 220.

In one embodiment, the imaging array 214 senses the image received, performs analog to digital conversion (ADC) and other signal processing and stores a limited amount of pixel data on each pixel of the imaging array 214. Circuitry on the strip 220 performs automatic gain control to adjust the gain on the pixel signals received for subsequent processing. The data is then converted to digital pixel data, by analog to digital converter, to minimize noise associated with transmitting analog lines over a relatively long distance. Signal processing is then performed on the digital pixel data to enhance the image detected by the imaging array. For example, automatic white balance, automatic exposure control, gamma control can be applied. In addition, the luminance and chrominance can be separated for subsequent processing. As the signals output from the imaging arrays are output based upon position (e.g., column by column), position information relative to the matrix of the image sensed is maintained. Preferably the digitally converted signals received from the imaging arrays are configured into data words indicating the spatial planar coordinates of an individual capacitor, and the chrominance and intensity of the light incident on the silicon of the capacitor. It will be recognized that various digital data structures may be used to format the digital data. The data words thus collectively represent a pixel map of an image frame as photographed by the imaging array when the shutter aperture of the camera is open.

In certain embodiments, a digital counter provides a digital count-signal indicating the number of times the shutter aperture of the camera has opened since the counter was last reset. This count value is indicative of the number of images collected since, for example, the last download of images from the adapter to an external device. In one embodiment, the counter is a separate logic device coupled to the light detector. The light detector, when light is detected due to the opening of the shutter aperture, issues a clock signal, to increment the count maintained by the counter. The signal representative of the count is appended to the data words corresponding to the image received by the imaging array. Thus, data words generated on distinct openings of the shutter aperture may be distinguished from other data words generated at the same planar spatial coordinates.

In one embodiment that works with 35 mm film cameras, eight perforations are formed for every frame along a longer side edge of the strip 220. In cameras using this 35 mm film, generally, a sprocket having eight teeth to engage with the perforations of the film is employed, and the frame advance of the film is controlled by detecting one rotation of the sprocket during the film transport.

The strip 220 can be made of a plastic material such as PET in one embodiment. The imaging arrays 214 include thin film transistor (TFT) elements deposited on PET. The strip 220 can be processed using a "roll to roll" fashion using steps such as unwinding a web of material from one roll, passing it through process stations (deposition station, etching/patterning station and packaging station), and winding the material onto another roll. One exemplary roll-to-roll process is available from Rolltronics Corporation of Menlo Park, Calif. In one embodiment, to deposit the TFT elements onto the strip 220, plasma enhanced chemical vapor deposition (PECVD) is used to deposit $SiO_2$ layers on both the front and back sides of the PET strip 220. The top layer acts as both a barrier to contamination of the Si layer and a thermal buffer for the plastic during laser melting. The bottom layer serves to balance thermal stresses and also to protect the PET from various processing chemicals and reduce its permeability to water vapor after fabrication. An amorphous silicon layer is then deposited on top of the barrier oxide using DC sputtering. Next the silicon layer is crystallized using a pulsed excimer laser. Since the strip 220 is 35 mm wide, the laser can crystallize the silicon layer in a single pass, resulting in better quality film than if the laser had to make multiple passes to crystallize the silicon layer.

The TFT device stack is completed by depositing a PECVD gate oxide, and an aluminum gate layer. The gate level is patterned using a silicon photolithography system and wet-etching. The silicon layer is photolithographically defined and dry-etched to produce isolated TFT islands. A contact isolation layer is deposited, patterned, and wet-etched to form contact holes, and an aluminum interconnect layer is sputtered, patterned and wet-etched to complete the TFT structure. The silicon melting and recrystallization is rapid enough that, in combination with a sufficiently thick barrier oxide, the PET substrate remains at a relatively low temperature throughout the bulk of the process and is insufficient to cause damage to the PET. The resulting strip 220 is light in weight, thin in substrate thickness, and mechanically durable.

The processor 206 is also connected to actuators that physically controls a number of camera settings. The actuators are connected to a shutter speed control unit that opens and closes for a predetermined time and a lens opening control unit for adjusting light levels to be received by the imaging array 214. Further, a lens focusing unit is provided to automatically focus the images, based on information provided by sensor. The processor 206 reads data from the distance sensing portion of the sensors and instructs the actuator to adjust the lens focusing unit until a photographic lens reaches a position corresponding to the object distance data to perform the auto-focusing operation. The lens may be automatically switched with additional lens to provide zoom or panoramic view. Additionally, the lens have one or optional filters to filter lights coming to the lens. Also, a flash unit and sensors are connected to the processor 206 to sense and provide corrective actions during the snapping of the picture. In the event that the light sensor detects a low light level, the sensor informs the processor 206 to take corrective actions, including changing the settings of the shutter speed control unit and the lens opening control unit. Additionally, the flash unit may be actuated, depending on the availability of light, to provide additional lighting.

In one embodiment, the adapter 200 includes control logic that controls a shutter on the imaging array (the imaging array shutter is separate from the mechanical shutter aperture of the camera). Using this feature, the camera can be set to operate in accordance with the mechanical shutter aperture speed or to operate at a speed much faster than the mechanical shutter aperture speed is capable of Shutter speeds in ordinary cameras are normally limited to approximately $1/5,000$ of a second, depending on the speed of the circuitry used. In the adapter of the present invention, the shutter speeds of the imaging array 214 can be set to approach $1/100,000$ of a second. As noted, the imaging array shutter speed can be set to coincide with the mechanical shutter speed of the camera. It should be noted that the features above do not necessarily replace the features of the camera itself; instead, these features augment the camera's own controls, allowing a photographer an incredible range of effects.

The strip 220 has a leader segment for loading the strip on a take-up spool in the camera. In one position, the flexible strip 220 is wound on a spool 203 and is contained in a substantially cylindrical cartridge shell 202. When the cartridge 202 is loaded in the camera, the cartridge 202 is placed in the film chamber 104 and subsequently the end of the leader segment is inserted into an appropriate slot in the film take-up spool. Thereafter, the film take-up spool is driven to rotate in a film-winding direction to wind the strip 220 on the film take-up spool. The film take-up spool can be driven manually or driven by a motor. The strip 220 fits within the film chamber 104 of the camera when the film chamber door 106 closes. When closed, the film chamber door 106 encloses the strip 220.

The strip 220 is wound onto the film take-up spool, frame by frame, each time a picture is taken. After taking the last exposure, the strip 220 is further wound onto the film take-up spool until the strip 220 is entirely wound onto the film take-up spool. Thereafter, the strip 220 is rewound back inside the cartridge 220. Digital image data can be saved after each image is taken, or can be saved in bulk when the strip 220 is rewound back inside the cartridge 220.

Thereafter, the film take-up spool is driven to rotate in a film-winding direction to wind the strip 220 on the film take-up spool manually or driven by a motor. The strip 220 is wound onto the film take-up spool, frame by frame, each time a picture is taken. The strip 220 can be wound and rewound in the camera until the storage unit 208 is full. Thereafter, the photographer is notified that the camera's memory is full.

When the transportation and saving of the information are completed, a solenoid/roller disengagement operation is conducted where the strip 220 is released from suction solenoids or rotary rollers and the solenoids or rollers are moved to a recess in the camera. The winder 140 rewinds the strip 220 until the continuous output from the media photoreflector has been deasserted, indicating that the leader portion of the strip 220 has passed. Thus, the rewinding of the strip 220 is completed so that only the leader portion of the strip 220 is outside of the cartridge 202.

At the end of the photographic session, the cartridge 202 can be removed from the camera chamber 104. Consequently, the content stored in the cartridge 202 can be uploaded to a host computer using the serial port, the USB port, the PCMCIA port, the infrared port, or the wireless port as appropriate. The content of the cartridge 202 can then be cleared for another photography session, or another new cartridge can be loaded in the camera chamber for another photography session.

In addition to storing image data, the processor 206 also records digital data, including print formats, lighting conditions, subject distance, time and date exposure. Such digital data is communicated automatically to photographic finishers who then utilize the data to improve print quality and add the customized, personalized touch to each print.

Figure 3:
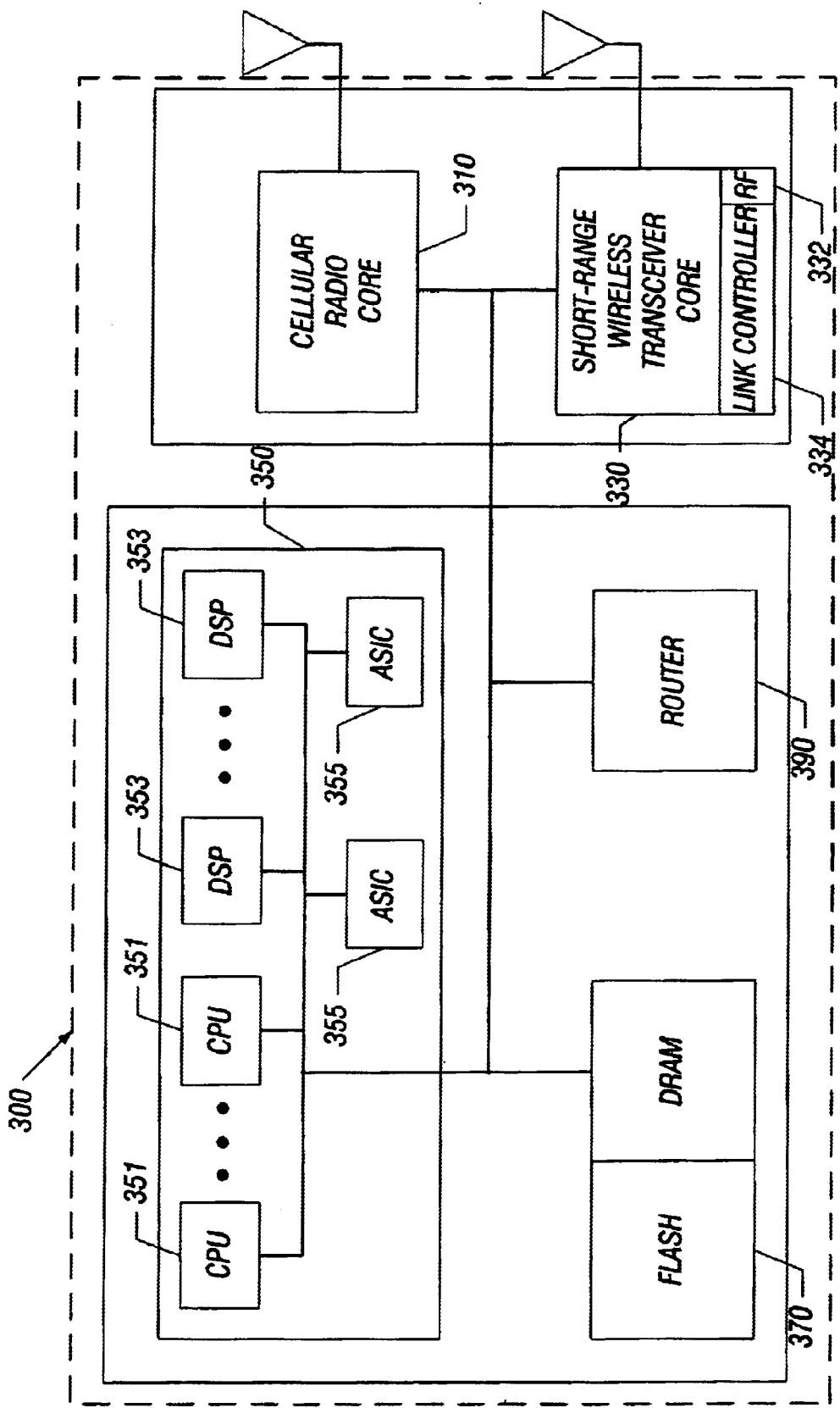
FIG. 3 shows one embodiment that supports wireless data communication between the adapter and a remote computer.

FIG. 3 shows one embodiment that supports wireless data communication between the adapter 200 and a remote computer. In this embodiment, the processor and a wireless communicator device 300 are fabricated on a single silicon integrated chip (IC). In one implementation, the device 300 is an integrated CMOS device with radio frequency (RF) circuits, including a cellular radio core 310 and a short-range wireless transceiver core 330, along side digital circuits, including a reconfigurable processor core 350, a high-density memory array core 370, and a router 390. The high-density memory array core 170 can include various memory technologies such as flash memory and dynamic random access memory (DRAM), among others, on different portions of the memory array core.

The reconfigurable processor core 350 can include one or more processors 351 such as MIPS processors and/or one or more digital signal processors (DSPs) 353, among others. The reconfigurable processor core 350 has a bank of efficient processors 351 and a bank of DSPs 353 with embedded functions. These rocessors 351 and 353 can be configured to operate optimally on specific problems. For example, the bank of DSPs 353 can be optimized to handle discrete cosine transforms (DCTs) or Viterbi encodings, among others. Additionally, dedicated hardware 355 can be provided to handle specific algorithms in silicon more efficiently than the programmable processors 351 and 353. The number of active processors are controlled depending on the application, so that power is not used when it is not needed. This embodiment does not rely on complex clock control methods to conserve power, since the individual clocks are not run at high speed.

One exemplary processor embedded in the multiprocessor core 350 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) instructions in either scalar or vector mode. Other parts of the exemplary processor include an instruction pipeline, a multiplexer, one or more instruction decoders, and a read data register. A program counter (PC) register addresses the memory system 370. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 350 incorporates data pathways between the various functional units. The lines of the data pathways may be synchronously used for writing information into the core 350, or for reading information from the core 350. Strobe lines can be used for this purpose.

In operation, instructions within the instruction pipeline are decoded by one or more of the instruction decoders to produce various core control signals that are passed to the different functional elements of the processor core 350. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 350. These flags may include processing mode flags (e.g. system mode, user mode, memory abort mode, etc.) as well as flags indicating the occurrence of zero results in arithmetic operations, carries and the like.

Through the router 390, the multi-mode wireless communicator device 300 can detect and communicate with any wireless system it encounters at a given frequency. The router 390 performs the switch in real time through an engine that keeps track of the addresses of where the packets are going. The router 390 can send packets in parallel through two or more separate pathways. For example, if a Bluetooth™ connection is established, the router 390 knows which address it is looking at and will be able to immediately route packets using another connection standard. In doing this operation, the router 390 periodically scans its environment ('ping') to decide on optimal transmission medium. The router 390 can send some packets in parallel through both the primary and secondary communication channel to make sure some of the packets arrive at their destinations.

The reconfigurable processor core 350 controls the cellular radio core 310 and the short-range wireless transceiver core 330 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 310 provides wide area network (WAN) access, while the short-range wireless transceiver core 330 supports local area network (LAN) access. The reconfigurable processor core 350 has embedded read-only-memory (ROM) containing software such as GSM, GPRS, Edge, and/or Bluetooth™ protocol software, among others.

In one embodiment, the cellular radio core 310 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 312, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

Turning now to the short-range wireless transceiver core 330, the short-range wireless transceiver core 330 contains a radio frequency (RF) modem core 332 that communicates with a link controller core 334. The processor core 350 controls the link controller core 334. In one embodiment, the RF modem core 332 has a direct-conversion radio architecture with integrated VCO and frequency synthesizer. The RF-unit 332 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 334 provides link control function and can be implemented in hardware or in firmware. One embodiment of the core 334 is compliant with the Bluetooth™ specification and processes Bluetooth™ packet types. For header creation, the link controller core 334 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office, takes one or more pictures using the adapter 200 and a conventional camera, and sends the digital pictures over the Internet on a portable computer through a wired local area network cable such as an Ethernet cable. Then the user walks to a nearby cubicle. As the user disconnects, the device 300 initiates a short-range connection using a Bluetooth™ connection. When the user drives from his or her office to an off-site meeting, the Bluetooth™ connection is replaced with cellular telephone connection. Thus, the device 300 enables easy synchronization and mobility during a cordless connection, and open up possibilities for establishing quick, temporary (ad-hoc) connections with colleagues, friends, or office networks. Appliances using the device 300 are easy to use since they can be set to automatically find and contact each other when within range.

The processor core 350 can implement a JPEG compression module to compress still images. Additionally, the processor core 350 can implement an MPEG compression module to compress video segments.

The processor core 350 can also execute code to provide preprocessing functions that can mimic virtually any effect a photographer might desire, even if the effect is not achievable using ordinarily available photographic equipment. For example, the adapter could include a user-programmable preprocessing digital distorter, set by the user-photographer, that modifies the signals sent from the imaging array. Digital distortion can produce effects that cannot be achieved using film-based photography. In addition, one embodiment of the adapter includes an internal timer that allows integration of the image over time on the adapter itself, producing data that exactly simulate a photographic image that would be produced using film. This timer can be used to simulate opening a shutter extremely fast, or can be used in conjunction with the camera's own shutter speed to achieve varying results.

Using suitable software, the processor core 350 supports editability, which allows correction and facilitates creative expression by including features that extend the capabilities of film-based technology, giving photographers unprecedented control over the photographs produced. Thus, the adapter can provide extremely high-precision and high-resolution control, e.g., aperture sizes and magnifications, over images, much more than would otherwise be allowed using only the camera knobs and dials.

Power to the adapter can be generated from a variety of sources. For portability, it is preferred that the power supply is a battery. In one embodiment, the adapter is integrally formed with a battery. Alternately, the power supply includes a connection to the camera battery and draws power from the camera battery typically used to power the camera flash and other electrical components. Additional batteries can be provided as part of or adjacent to the adapter. These batteries would be stored in one or both of the areas typically used to store a roll of film or take up exposed film. Because the image is stored digitally in the memory and not on film, there is no danger of exposing film, and the film chamber door may be opened to recharge or replace the battery or other components without concern of damaging the photographic images taken.

Figure 4A:
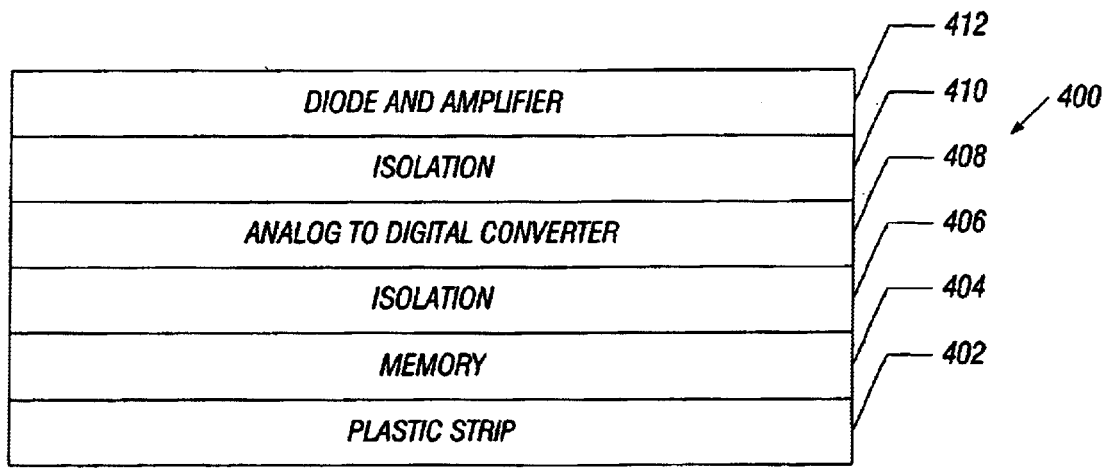
FIGS. 4A and 4B illustrate a strip embodiment with multi-layers of electronics deposited thereon.
Figure 4B:
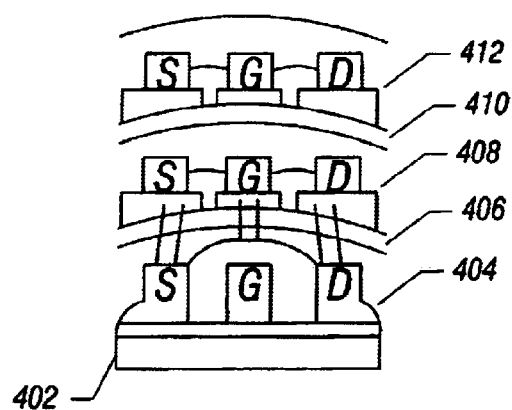

FIGS. 4A and 4B show one embodiment of a strip 400 having multi-layer depositions thereon. FIG. 4A shows a block diagram of the multi-layer strip 400, while FIG. 4B shows an exemplary cross-sectional view of the multi-layer strip 400. The strip 400 starts with a base plastic layer 402. Memory elements such as flash and electrically erasable programmable read only memory (EEPROM) elements are deposited in a memory layer 404 above the plastic layer 402. Next, an isolation layer 406 is deposited above the memory layer 404 before an analog to digital conversion layer 408 is deposited. A second isolation layer 410 is deposited above the analog to digital conversion layer 408. The imaging elements with diodes and amplifiers are deposited in an imaging layer 412 above the isolation layer 410. The embodiment of FIGS. 4A–4B thus includes memory elements, analog to digital converter, and imaging elements all on the space of a pixel of the imaging array 214. This embodiment is advantageous in that a low-power single bit ADC is used and the result is buffered on the pixel. This embodiment avoids the need to send the analog output of the imaging element over a long distance, which can corrupt the signal and result in poor quality images.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although the electronic camera-in-camera adapter operates within a 35 millimeter camera, it will be apparent to those skilled in the art that the adapter can be used in other types of cameras utilizing different film sizes. Because different cameras have slightly different physical dimensions, it is apparent that some embodiments of the present invention would be designed specifically for particular models of standard cameras. However, for the same film size camera it is contemplated that some embodiments can be adjustable coupling the circuit board components onto rails that are adjustable either by a spring loading or screw mechanism that sets the length of the adapter to fit within the length of the film chamber.

As noted above, some embodiments of the present invention include a video-port, allowing either a direct wired, e.g., coaxial connection, or an antenna for a wireless signal connection with a typical television set. Other embodiments provide serial or parallel data transfer to a computer system, either directly or via a peripheral component. Additional intelligent components can be included in other embodiments, allowing using wide area networks such as the Internet. Still other embodiments allow connection to an external memory that a photographer might wear on a belt or might attach to an external surface of the camera. Such an external memory may be magnetic rather than solid state, allowing much greater storage capacity to store digital images. Using wireless technology, other circuitry included in other embodiments allows easy wireless downloading of information to external hard drives or other computer equipment, or to a receiver coupled to a television set.

Further, the embodiments can be used for still photography or video. The difference in application dictates the size of the memory as video requires significantly more memory. However, using compression, such as compression techniques compatible with the JPEG standard, the amount of memory needed can be reduced.

In some embodiments, additional memory can be used to capture digitized data representing images or parts of images as the images are taken. For example, the memory may be a storage device such as a disk drive or the like. For the user that intends to take a large quantity of pictures, the disk drive device can be constructed to withstand rough handling and of a small enough size to enable the user to clip the drive on his person, such as his belt. Alternately, this data can be transferred to an antenna circuit located external to the adapter for wireless transmission to a remote receiver that may be coupled to a variety of types of devices such as a television set or a video recorder, to a computer system having a processor, to an internet-linked processor, to a fax modem for transmission via telephone or ISDN lines, or to a satellite up-link. Further, due to the variety of memory devices available, different embodiments of the present invention allow different numbers of exposures or images to be stored. Furthermore, the adapter can be configured to generate different resolutions (i.e., number of pixels per image) of images as well as the number of bits per pixel. The resolution can be configured to vary according to the embodiment of the adapter used; alternately, the adapter could be configured to be field programmable, enabling the user to selectively decrease the number of exposures the memory is capable of storing for increased resolution. The following claims are intended to encompass all such modifications.

What is claimed is:

1. An apparatus for capturing digital images from
a film-based camera having a chamber to receive a film cartridge and a take-up spool to advance the film after each shot, comprising:
a cartridge shaped to fit in the camera film chamber, the cartridge comprising a processor, a storage unit coupled to the processor, and an input output unit coupled to the processor; and
a flexible strip having one end coupled to the cartridge and the other end to be wound on the camera take-up spool, the flexible strip having a plurality of imaging arrays deposited thereon, each of which to capture one of the digital images, each of the imaging arrays to communicate with the processor.

2. The apparatus of claim 1, wherein the strip is made from plastic.

3. The apparatus of claim 1, wherein the strip is made from polyethylene terephthalate (PET).

4. The apparatus of claim 1, wherein the strip is made from a roll-to-roll process.

5. The apparatus of claim 1, further comprising a shutter opening sensor affiliated with each of the plurality of imaging arrays.

6. The apparatus of claim 1, wherein the storage unit to store parameter data associated with each digital image.

7. The apparatus of claim 6, wherein the parameter data includes print format, lighting condition, subject distance, time of exposure, or date of exposure.

8. The apparatus of claim 6, wherein the parameter data to be communicated automatically to a photographic finisher for utilization of the parameter data to improve print quality.

9. The apparatus of claim 6, further comprising a compression engine coupled to the processor to compression image data or video data.

10. The apparatus of claim 9, wherein the compression engine includes JPEG or MPEG.

11. The apparatus of claim 1, wherein the input output unit includes a serial port, a Universal Serial Bus (USB) port, a PCMCIA port, an infrared port, or a wireless port.

12. The apparatus of claim 1, wherein the input output unit is a Bluetooth port.

13. The apparatus of claim 1, wherein the camera has a rewinder motor to automatically advance or retract the flexible strip.

14. The apparatus of claim 13, further comprising a tension generator to drive a spool in the cartridge and controlled by the processor, the tension generator to retard spool rotation to simulate end of film to the camera.

15. The apparatus of claim 1, wherein the processor, the storage unit and the input output unit are embedded in a single integrated circuit.

16. The apparatus of claim 1, wherein each of the plurality of imaging arrays comprises an imaging layer, a conversion layer, and a memory layer.

17. A method for taking a digital image from a film-based camera having a shutter, a chamber to receive a film cartridge and a take-up spool to advance the film after each shot, method comprising:
- mounting a cartridge in the camera film chamber, the cartridge storing a flexible strip comprising a plurality of imaging arrays deposited thereon;
- winding one end of the flexible strip on the camera take-up spool; and
- upon detecting a shutter opening, capturing the digital image and storing the captured image.

18. The method of claim 17, further comprising advancing the flexible strip to position the next imaging array for the next image.

19. The method of claim 18, further comprising rewinding the flexible strip into the cartridge and then saving the stored captured images in a memory of the cartridge.

20. The method of claim 17, further comprising sending the digital image to a remote processor through a serial port, a Universal Serial Bus (USB) port, a PCMCIA port, an infrared port, or a wireless port.

21. The method of claim 17, further comprising controlling an imaging array shutter separately from a mechanical shutter of the film-based camera.

22. The method of claim 17, further comprising wirelessly transmitting the captured image via a first communication channel and a second communication channel.

23. The method of claim 17, further comprising transmitting the captured image to an external memory coupled to the film-based camera.

24. An apparatus comprising:
- a cartridge for insertion into a camera, the cartridge comprising:
  - a core portion including a processor and a memory;
  - a spool; and
  - a strip wound around the spool, the strip including a plurality of imaging arrays, each to capture a digital image.

25. The apparatus of claim 24, wherein the strip to be wound onto a take-up spool of the camera.

26. The apparatus of claim 24, further comprising a battery within the cartridge.

27. The apparatus of claim 24, wherein the processor and the memory are embedded on a single integrated circuit.

28. The apparatus of claim 24, wherein the strip further comprises a bus to communicate the digital image of each of the plurality of imaging arrays to the core portion.

29. The apparatus of claim 24, further comprising a wireless communicator coupled to the processor.

30. The apparatus of claim 29, wherein the wireless communicator and the processor reside on a single integrated circuit.

31. The apparatus of claim 24, wherein each of the plurality of imaging arrays comprises an imaging layer, a conversion layer, and a memory layer.

* * * * *